(12) United States Patent
Nakabayashi et al.

(10) Patent No.: US 10,417,016 B2
(45) Date of Patent: Sep. 17, 2019

(54) DATA COMMUNICATION SYSTEM FOR VEHICLE

(71) Applicant: DENSO CORPORATION, Kariya, Aichi-pref. (JP)

(72) Inventors: Naoki Nakabayashi, Kariya (JP); Takumi Nakagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 15/748,394

(22) PCT Filed: Oct. 14, 2016

(86) PCT No.: PCT/JP2016/080513
§ 371 (c)(1),
(2) Date: Jan. 29, 2018

(87) PCT Pub. No.: WO2017/122402
PCT Pub. Date: Jul. 20, 2017

(65) Prior Publication Data
US 2018/0232246 A1    Aug. 16, 2018

(30) Foreign Application Priority Data
Jan. 14, 2016  (JP) .................................... 2016-5238

(51) Int. Cl.
*G06F 9/44* (2018.01)
*G06F 9/445* (2018.01)
(Continued)

(52) U.S. Cl.
CPC .......... *G06F 9/44589* (2013.01); *G06F 11/00* (2013.01); *G06F 13/00* (2013.01);
(Continued)

(58) Field of Classification Search
CPC . H04L 2209/84; H04L 9/3247; G06F 9/4401; G06F 8/65; G06F 21/572;
(Continued)

(56) References Cited

U.S. PATENT DOCUMENTS 5,475,758 A * 12/1995 Kikuchi ................ G06F 21/335
340/5.74
6,938,171 B1 * 8/2005 Isomichi ................. G06F 21/41
713/153
(Continued)

FOREIGN PATENT DOCUMENTS

JP    2014-138380 A    7/2014

*Primary Examiner* — Zahid Choudhury
(74) *Attorney, Agent, or Firm* — Posz Law Group, PLC (57) ABSTRACT

When a verification result by a verifier is a success, an electronic control unit activates a rewriting target program stored in a second storage, and transmits a verification result reply signal that indicates that the verification result is a success to a relay apparatus. When a verification result by the verifier is a failure, the electronic control unit activates a communication control program stored in a first storage, and transmits a verification result reply signal that indicates that the verification result is a failure to the relay apparatus. Upon receiving the verification result reply signal that indicates that the verification result is a success, the relay apparatus identifies a correct rewriting operation with the rewriting target program. In contrast, upon receiving the verification result reply signal that indicates that the verification result is a failure, the relay apparatus identifies an incorrect rewriting operation with the rewriting target program.

7 Claims, 5 Drawing Sheets

(51) Int. Cl.
*G06F 13/00* (2006.01)
*G06F 11/00* (2006.01)
*G06F 21/57* (2013.01)
*H04L 9/32* (2006.01)
G06F 9/4401 (2018.01)
G06F 8/65 (2018.01)

(52) U.S. Cl.
CPC ............ *G06F 21/57* (2013.01); *G06F 21/572* (2013.01); *H04L 9/3247* (2013.01); *G06F 8/65* (2013.01); *G06F 9/4401* (2013.01); *H04L 2209/84* (2013.01)

(58) Field of Classification Search
CPC .......... G06F 21/57; G06F 13/00; G06F 11/00; G06F 9/44589
See application file for complete search history.

(56) References Cited

U.S. PATENT DOCUMENTS

| | | | | |
|---|---|---|---|---|
| 7,443,884 | B2* | 10/2008 | Shima | H04L 63/0823 370/401 |
| 9,672,088 | B2* | 6/2017 | Hasebe | G06F 13/00 |
| 2005/0144463 | A1* | 6/2005 | Rossebo | G06F 21/41 713/185 |
| 2007/0064952 | A1* | 3/2007 | Takada | H04L 51/066 380/286 |
| 2014/0289531 | A1* | 9/2014 | Yamakawa | H04L 9/3263 713/176 |

* cited by examiner

DATA COMMUNICATION SYSTEM FOR VEHICLE

CROSS REFERENCE TO RELATED APPLICATIONS

The present application is a U.S. national stage application of International Application No. PCT/JP2016/080513 and is based on Japanese Patent Application No. 2016-5238 filed on Jan. 14, 2016, the disclosures of which are incorporated herein by reference.

TECHNICAL FIELD

The present disclosure relates to a data communication system for vehicles.

BACKGROUND

There is conventionally provided a data communication system for vehicles, the system including (i) a relay apparatus receiving a rewriting target program from a rewriting apparatus and (ii) an electronic control unit (hereinafter, referred to as ECU) receiving the rewriting target program from the relay apparatus and executing a rewriting operation with the rewriting target program. Such a data communication system for vehicles needs to detect whether a rewriting operation with a rewriting target program is executed correctly or incorrectly from a risk that the rewriting operation using the rewriting target program may be executed incorrectly.

A method detecting whether a rewriting operation with a rewriting target program is executed correctly or incorrectly is disclosed in Patent literature 1, for instance. In the method disclosed in Patent literature 1, a plurality of ECUs each generate a verification message by using an identical algorithm, transmitting it to the server. When the values contained in respective verification messages received from the plurality of ECUs are different, or when a failure is determined in receiving a verification message which should be received, the server identifies an incorrect rewriting operation with the rewriting target program.

PATENT LITERATURE

Patent literature 1: JP 2014-138380 A

Such a method disclosed in Patent literature 1 involves the following issues. While undergoing a failure in receiving a verification message from an ECU when a rewriting operation with a rewriting target program is executed incorrectly, the server also undergoes a failure in receiving a verification message when a hardware fault occurs in the ECU. When undergoing a failure in receiving a verification message from an ECU, the server thus finds a difficulty in identifying individually an incorrect rewriting operation with the rewriting target program and a hardware fault occurring, as distinguished from each other. Further, when the values contained in the respective verification messages are different, the server is only enabled to identify an incorrect rewriting operation with a rewriting target program in any one of a plurality of ECUs, therefore finding a difficulty in identifying an ECU in which an incorrect rewriting operation with the rewriting target program is executed.

SUMMARY

It is an object to provide a data communication system for vehicles, which is capable of appropriately identifying an electronic control unit in which an incorrect rewriting operation with a rewriting target program is executed.

According to an aspect of the present disclosure, an electronic control unit is provided as including a verifier that decrypts a signature being encrypted, the signature being stored in a second storage when a rewriting target program is stored in the second storage. The verifier verifies the decrypted signature with a signature calculated from the rewriting target program stored in the second storage. When a verification result by the verifier is a success, the electronic control unit activates the rewriting target program stored in the second storage, then transmitting a verification result reply signal that indicates that the verification result is a success to the relay apparatus. In contrast, when a verification result by the verifier is a failure, the electronic control unit activates a communication control program stored in a first storage, then transmitting a verification result reply signal that indicates that the verification result is a failure to the relay apparatus.

In response to reception of the verification result reply signal that indicates that the verification result is a success from the electronic control apparatus after transmitting a verification result request signal to the electronic control unit, the relay apparatus identifies a correct rewriting operation with the rewriting target program in an electronic control unit which transmits the verification result reply signal. In contrast, in response to reception of the verification result reply signal that indicates that the verification result is a failure from the electronic control apparatus after transmitting the verification result request signal to the electronic control unit, the relay apparatus identifies an incorrect rewriting operation with the rewriting target program in an electronic control unit which transmits the verification result reply signal.

That is, even if determining that the rewriting operation with the rewriting target program fails, the electronic control unit activates the communication control program and transmits a verification result reply signal which indicates that the verification result is a failure to the relay apparatus. In response to the reception of the verification result reply signal that indicates that the verification result is a failure from the electronic control unit, the relay apparatus identifies an incorrect rewriting operation with the rewriting target program in an electronic control unit which transmits the verification result reply signal. This enables the relay apparatus to identify an incorrect rewriting operation with the rewriting target program by receiving the verification result reply signal that indicates that the verification result is a failure. In contrast, the relay apparatus is enabled to identify a hardware fault occurring by not receiving the verification result reply signal. The relay apparatus is thus enabled to identify individually an incorrect rewriting operation with the target program and a hardware fault occurring, which are distinguished from each other. Furthermore, upon identifying an incorrect rewriting operation with the rewriting target program, the relay apparatus can identify the electronic control unit in which an incorrect rewriting operation with the rewriting target program is executed. Thus, the electronic control unit, where an incorrect rewriting operation with the rewriting target program is executed, can be identified appropriately.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
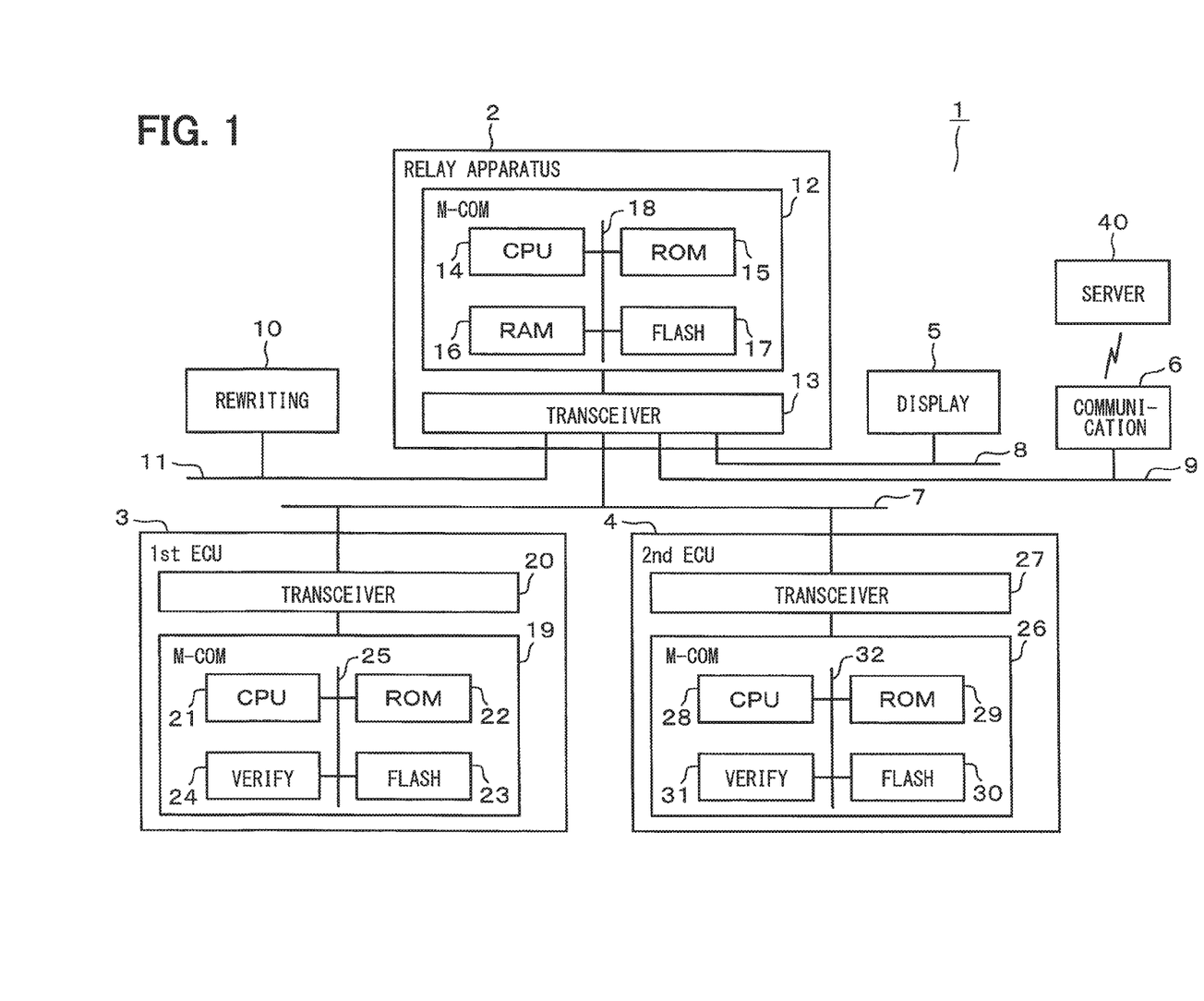
FIG. 1 is a functional block diagram illustrating an overall configuration according to an embodiment of the present disclosure.

The following explains an embodiment according to the present disclosure with reference to drawings. A data communication system 1 for vehicles includes a relay apparatus 2, a plurality of electronic control units (hereinafter, referred to as ECUs) 3 and 4, a display apparatus 5, and a communication apparatus 6. The relay apparatus 2 is an ECU which functions as a gateway. The ECUs 3 and 4 are ECUs which perform a vehicle control such as a control of a fuel system, a control of an air intake and exhaust system. The display apparatus 5 is configured to include a display apparatus of a navigation system, for example. The communication apparatus 6 is configured to include a data communication unit, for example. The relay apparatus 2 and ECUs 3 and 4 are connected via a bus 7. The present embodiment provides an example configuration in which, as a plurality of ECUs, two ECUs of a first ECU 3 and a second ECU 4 are connected with the bus 7. Another configuration may be alternatively provided in which more than two ECUs are connected with the bus 7. The relay apparatus 2 and the display apparatus 5 are connected via a bus 8. The relay apparatus 2 and the communication apparatus 6 are connected via a bus 9. The buses 7, 8, and 9 are buses which perform data communications with communication protocols specified by CAN. Moreover, the relay apparatus 2 is configured to be connected with a rewriting apparatus 10 serving as a reprogram tool via a bus 11. The bus 11 is also a bus which performs data communications with communication protocols specified by CAN.

The relay apparatus 2 includes a microcomputer 12 and a transceiver 13. The microcomputer 12 includes a CPU 14, a ROM 15, a RAM 16 being non-volatile (equivalent to a non-volatile storage), and a flash memory 17, which are connected via an internal bus 18. The CPU 14 executes a control program stored in the flash memory 17, thereby controlling an operation of the relay apparatus 2. When a rewriting data including a rewriting target program is received from the rewriting apparatus 10 by the transceiver 13 under a state where the rewriting apparatus 10 is connected to the relay apparatus 2 via the bus 11, the CPU 14 transmits the received rewriting data to the ECUs 3 and 4 via the bus 7 from the transceiver 13.

The first ECU 3 includes a microcomputer 19 and a transceiver 20. As in FIG. 2, the microcomputer 19 is configured to include a CPU 21, a ROM 22 (equivalent to a first storage), a flash memory 23 (equivalent to a second storage), and a verifier 24, which are connected with each other via an internal bus 25. The ROM 22, which is a storage element in which rewriting data is disabled, stores (i) a boot program which boots the first ECU 3 and (ii) a communication control program which controls data communications. The flash memory 23, which is a storage element in which rewriting data is enabled, can store an encrypted signature while storing an application program which controls an operation of the first ECU 3. The application program includes a communication control program which controls data communications. The CPU 21 executes the activation program stored in the ROM 22 and boots the first ECU 3; then, the CPU 21 executes the application program stored in the flash memory 23, and controls an operation of the first ECU 3. The verifier 24 includes a signature calculator 24a which calculates a signature, a public key storage 24b which stores a public key, and a decoder 24c which decrypts an encrypted signature by using the public key.

Figure 2:
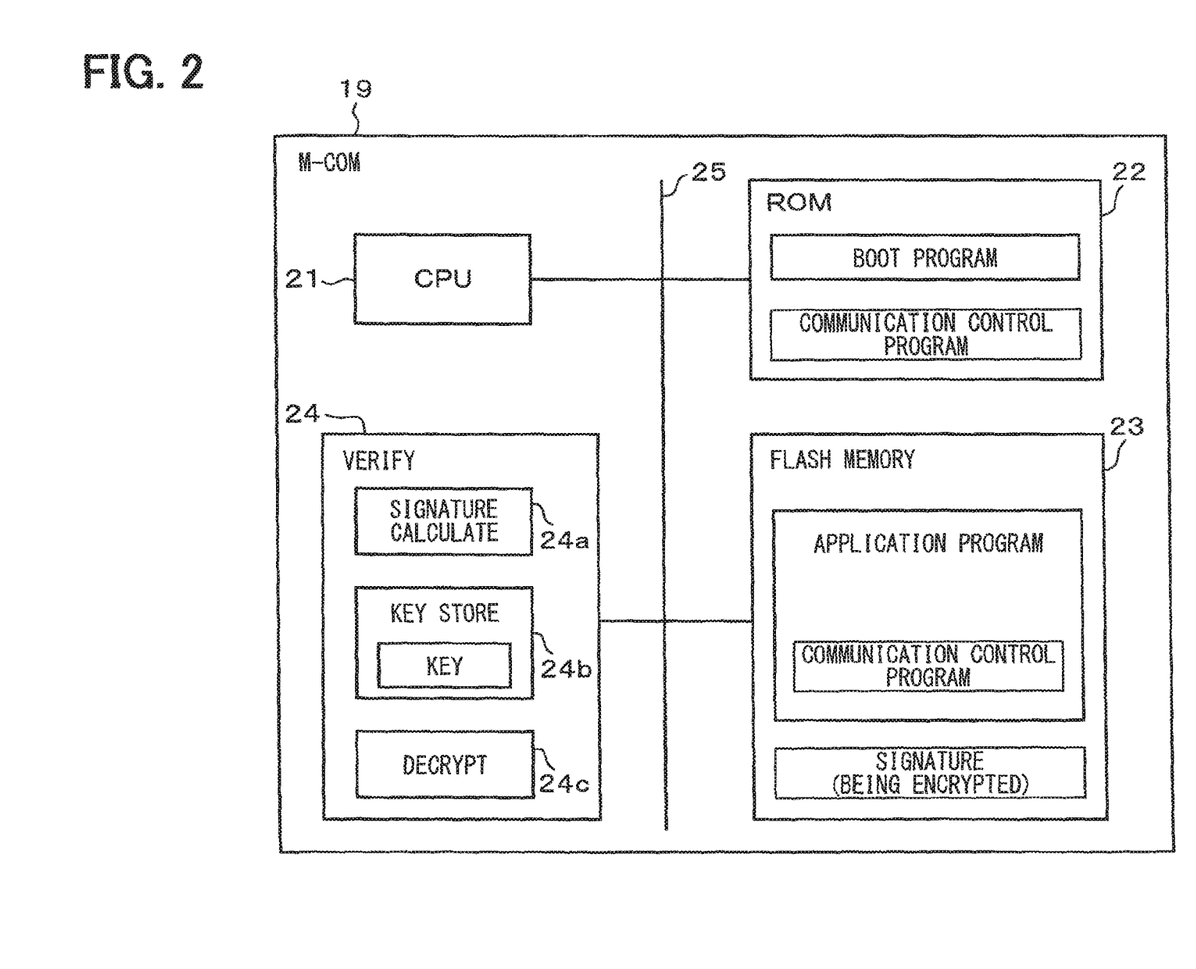
FIG. 2 is a functional block diagram illustrating a configuration of a microcomputer of an electronic control unit.

The second ECU 4, which has the same configuration as that of the first ECU 3, includes a microcomputer 26 and a transceiver 27. The microcomputer 26 is configured to include a CPU 28, a ROM 29 (equivalent to a first storage), a flash memory 30 (equivalent to a second storage), and a verifier 31, which are connected with each other via an internal bus 32. The CPU 28, the ROM 29, the flash memory 30, the verifier 31, and the internal bus 32 of the microcomputer 26 are, respectively, equivalent to the CPU 21, the ROM 22, the flash memory 23, the verifier 24, and the internal bus 25 of the microcomputer 19. The transceiver 27 is equivalent to the transceiver 20.

Figure 3:
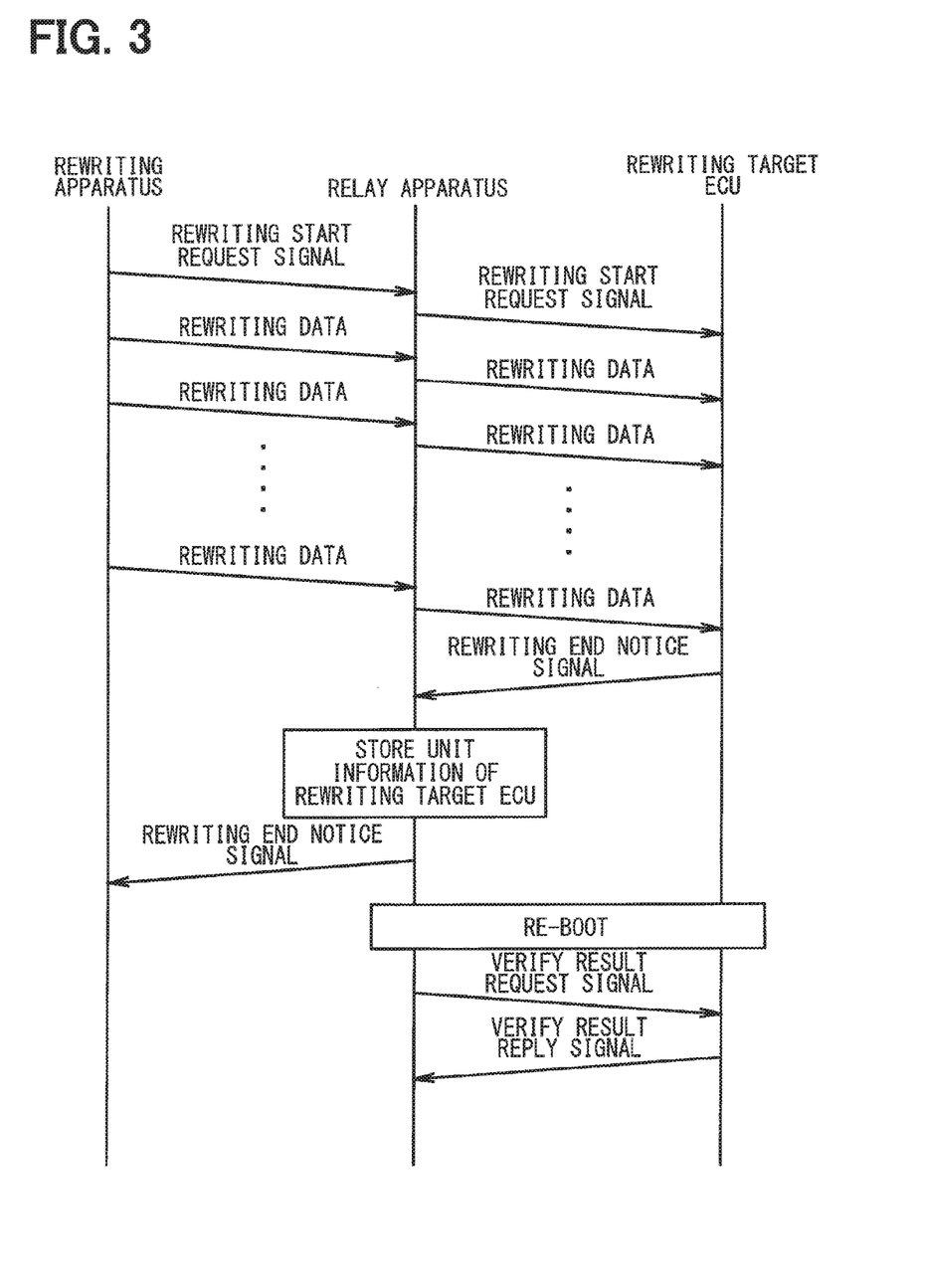
FIG. 3 is a sequence diagram.
Figure 4:
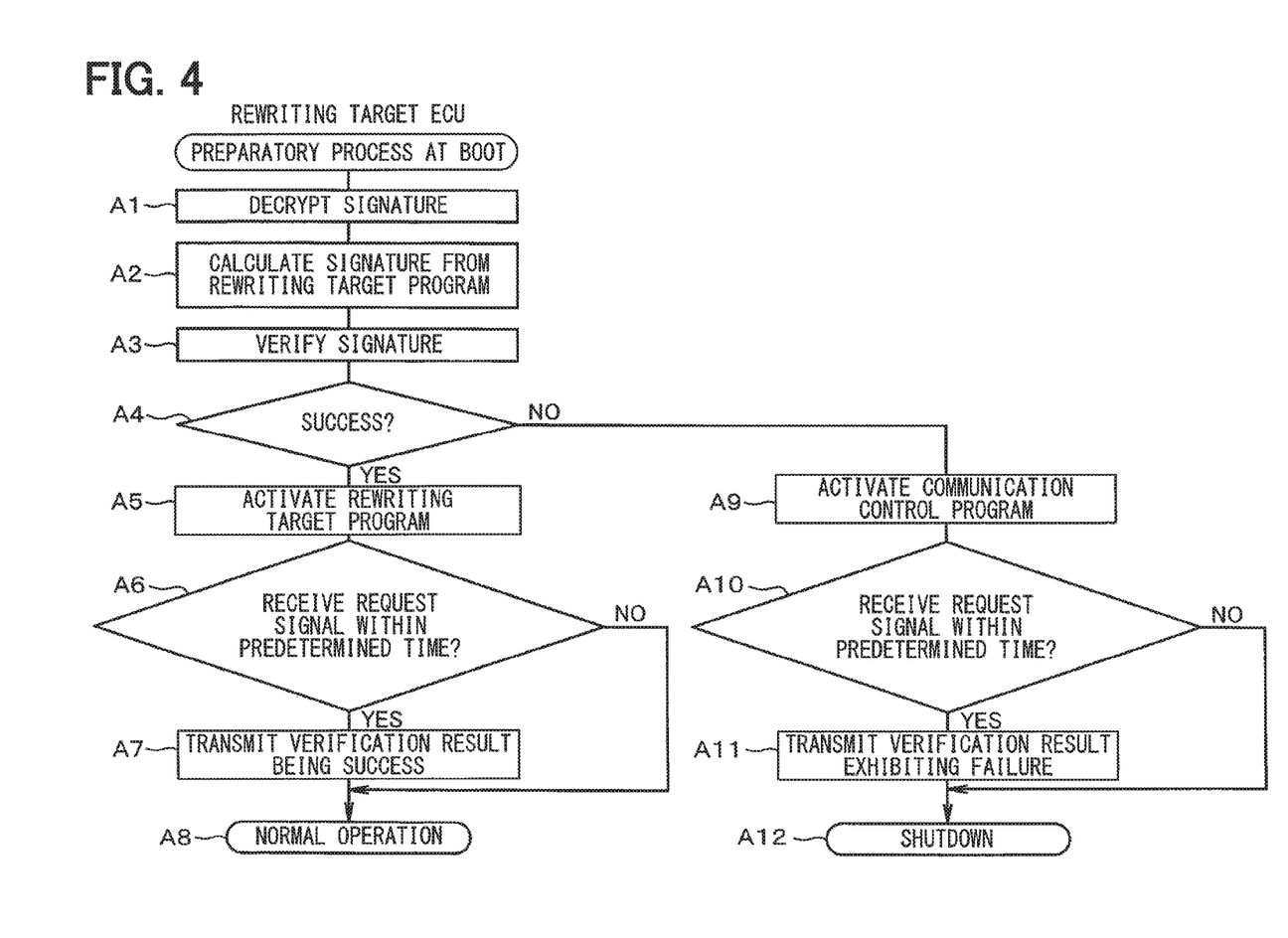
FIG. 4 is a flowchart illustrating a preparatory process at boot.
Figure 5:
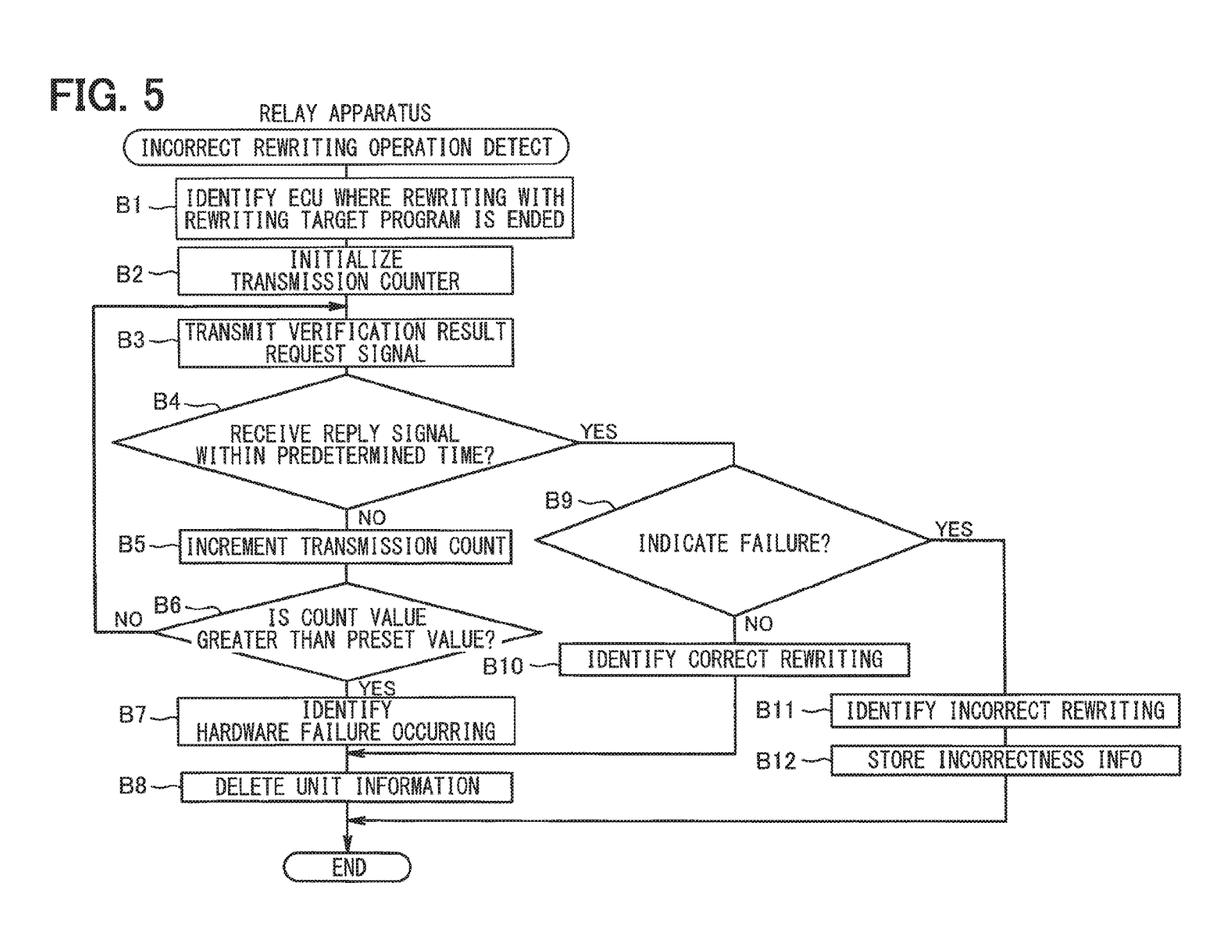
FIG. 5 is a flowchart illustrating an incorrect rewriting operation detecting process.

The following explains operations in the above configurations with reference to FIGS. 3 to 5. The following explains a case assuming an application program stored in the first ECU 3 is rewritten. In this case, the first ECU 3 which rewrites the application program is a rewriting target ECU; the application program transmitted to the first ECU 3 via the relay apparatus 2 from the rewriting apparatus 10 is a rewriting target program.

An operator, who operates rewriting of the application program, connects the rewriting apparatus 10 to the relay apparatus 2 via the bus 11, thereby operating the rewriting of the application program by using the rewriting apparatus 10. The rewriting apparatus 10 then transmits a rewriting start request signal to the relay apparatus 2. In the microcomputer 12 of the relay apparatus 2, as the transceiver 13 receives the rewriting start request signal from the rewriting apparatus 10, the CPU 14 controls the transceiver 13 to transmit the received rewriting start request signal to the first ECU 3. When the transceiver 13 then starts receiving a rewriting data including a rewriting target program from the rewriting apparatus 10, the CPU 14 controls the transceiver 13 to start transmitting the received rewriting data to the first ECU 3.

In the microcomputer 19 of the first ECU 3, upon starting receiving the rewriting data from the relay apparatus 2, the CPU 21 starts storing the received rewriting data in the flash memory 23. At this time, the CPU 21 stores in the flash memory 23 a signature, which is encrypted with a private key, from the rewriting target program. Upon ending the reception of the rewriting data from the relay apparatus 2, the CPU 21 transmits a rewriting end notice signal which indicates that a rewriting operation with the rewriting target program is completed to the relay apparatus 2 from the transceiver 20. At this time, the CPU 21 stores unit information that is able to identify the first ECU 3 in the rewriting end notice signal, transmitting it to the relay apparatus 2 from the transceiver 20. The unit information that is able to identify the first ECU 3 includes a CANID uniquely given to the first ECU 3. Note that "information," which may be used not only as an uncountable noun but also a countable noun, is equivalent to an informational item. One information is equivalent to one informational item; a plurality of informations are equivalent to a plurality of informational items.

In the microcomputer 12 of the relay apparatus 2, as the transceiver 13 receives the rewriting end notice signal from the first ECU 3, the CPU 14 extracts the unit information stored in the received rewriting end notice signal and stores the extracted unit information in the RAM 16. The CPU 14 then transmits a rewriting end notice signal from the transceiver 13 to the rewriting apparatus 10.

Subsequently, for instance, the operator switches the ignition of the vehicle from ON to OFF, and from OFF to ON; thereby the relay apparatus 2 and the first ECU 3 each switch from power ON to power OFF and from powered OFF to powered ON, thereby being rebooted. Upon being rebooted, the first ECU 3 performs a preparatory process at boot illustrated in FIG. 4. Upon being rebooted, the relay apparatus 2 performs an incorrect rewriting operation detecting process illustrated in FIG. 5. The following explains the respective processes.

(1) Preparatory Process at Boot

In the microcomputer 19 of the first ECU 3, with starting a preparatory process at boot, the CPU 21 reads the encrypted signature stored in the flash memory 23, and decrypts the read signature with the decoder 24c using the public key stored in the public key storage 24b (A1). The CPU 21 calculates a signature by the signature calculator 24a from the rewriting target program (that is, rewritten application program) currently stored in the flash memory 23 (A2). The CPU 21 verifies the signature decrypted by the decoder 24c with the signature calculated by the signature calculator 24a (A3).

When determining that both the signatures accord with each other and thus the verification results in success (A4: YES), the CPU 21 activates the rewriting target program (A5) and waits for a reception of the verification result request signal from the relay apparatus 2. The CPU 21 determines whether the verification result request signal is received by the transceiver 20 from the relay apparatus 2 within a predetermined period of time since the rewriting target program is activated (A6). When determining that the verification result request signal is received within the predetermined period of time since the rewriting target program is activated (A6: YES), the CPU 21 transmits a verification result reply signal which indicates that the verification result is a success to the relay apparatus 2 from the transceiver 20 (A7). The CPU 21 then proceeds to a normal operation process (A8). In contrast, when determining that the verification result request signal is not received within the predetermined period of time since the rewriting target program is activated (A6: NO), the CPU 21 proceeds to the normal operation process without transmitting any verification result reply signal to the relay apparatus 2 from the transceiver 20 (A8).

In contrast, when determining that both the signatures fail to accord with each other and thus the verification results in failure (A4: NO), the CPU 21 activates the communication control program stored in the ROM 22 (A9), and waits for a reception of the verification result request signal from the relay apparatus 2. The CPU 21 determines whether the verification result request signal is received by the transceiver 20 from the relay apparatus 2 within a predetermined period of time since the communication control program is activated (A10). When determining that the verification result request signal is received within the predetermined period of time since the communication control program is activated (A10: YES), the CPU 21 transmits a verification result reply signal which indicates that the verification result is a failure to the relay apparatus 2 from the transceiver 20 (A11). The CPU 21 then proceeds to a shutdown process that shuts down the microcomputer 19 (A12). In contrast, when determining that the verification result request signal is not received within the predetermined period of time since the communication control program is activated (A10: NO), the CPU 21 proceeds to the shutdown process without transmitting any verification result reply signal to the relay apparatus 2 from the transceiver 20 (A12).

(2) Incorrect Rewriting Operation Detecting Process

In the microcomputer 12 of the relay apparatus 2, with the start of the incorrect rewriting operation detecting process, the CPU 14 reads the unit information stored in the RAM 16 and identifies an ECU in which the rewriting operation with the rewriting target program is executed (31). In the present embodiment, the CPU 14 identifies the first ECU 3 as an ECU in which the rewriting operation with the rewriting target program is executed. The CPU 14 sets the count value of the transmission counter to be "0" for initialization (B2); transmits a verification result request signal to the first ECU 3, which is identified, from the transceiver 13 (B3); and waits for the reception of a verification result reply signal from the first ECU 3. The CPU 14 determines whether the verification result replay signal is received by the transceiver 13 from the first ECU 3 within a predetermined period of time since the verification result request signal is transmitted (B4).

When determining that the verification result replay signal is not received within the predetermined period of time since the verification result request signal is transmitted (B4: NO), the CPU 14 increments the count value of the transmission counter (B5), and determines whether the count value which is incremented becomes greater than a preset value (B6). When determining that the count value which is incremented does not become greater than a preset value (B6: NO), the CPU 14 returns to step B3 and repeats the processing after step B3, transmitting again a verification result request signal to the first ECU 3, which is identified, from the transceiver 13. When determining that the count value which is incremented becomes greater than a preset value (B6: YES), the CPU 14 identifies a hardware fault occurring in the first ECU 3 (B7) and deletes the unit information on the first ECU 3 stored in the RAM 16 (B8), then ending the incorrect rewriting operation detecting process.

In contrast, when determining that the verification result replay signal is received within the predetermined period of time since the verification result request signal is transmitted (B4: YES), the CPU 14 determines whether the verification result reply signal indicates that the verification result is a failure (B9). When determining that the verification result reply signal does not indicate that the verification result is a failure, i.e., when determining that the verification result reply signal indicates that the verification result is a success (B9: NO), the CPU 14 identifies a correct rewriting operation with the rewriting target program (B10), and deletes the unit information on the first ECU 3 stored in the RAM 16 (B8), then ending the incorrect rewriting operation detecting process.

In contrast, when determining that the verification result reply signal indicates that the verification result is a failure (B9: YES), the CPU 14 identifies an incorrect rewriting operation with the rewriting target program (B11), and stores the incorrect information, which indicates that an incorrect rewriting operation with the rewriting target program is executed, as a log in the RAM 16 (B12), then ending the incorrect rewriting operation detecting process.

Note that upon identifying the incorrect rewriting operation with the rewriting target program, the CPU 14 transmits an incorrectness identifying signal to the second ECU 4, the display apparatus 5, and the communication apparatus 6 from the transceiver 13. Upon receiving the incorrectness identifying signal from the relay apparatus 2, the second ECU 4 identifies an incorrect rewriting operation in the first ECU 3 with the rewriting target program, and performs a fail-safe operation such as interrupting a process which the second ECU 4 executes in cooperation with the first ECU 3. Upon receiving the incorrectness identifying signal from the relay apparatus 2, the display apparatus 5 displays the displayed information which indicates that the incorrect rewriting operation with the rewriting target program is executed in the first ECU 3. Upon receiving the incorrectness identifying signal from the relay apparatus 2, the communication apparatus 6 transmits the transmission information, which indicates that the incorrect rewriting operation with the rewriting target program is executed in the first ECU 3, to the server 40 via a wide-area communication network, for instance.

The above explains the case that an application program stored in the first ECU 3 is rewritten. The case that an application program stored in the second ECU 4 is rewritten is explained similarly.

As explained above, the present embodiment provides the following advantageous effects.

In the data communication system 1 for vehicles, even if determining that the rewriting operation with the rewriting target program fails, the ECU 3, 4 activates the communication control program stored in the ROM 22, 29 and transmits a verification result reply signal which indicates that the verification result is a failure to the relay apparatus 2. In response to the reception of the verification result reply signal that indicates that the verification result is a failure from the ECU 3, 4, the relay apparatus 2 identifies an incorrect rewriting operation with the rewriting target program in the ECU 3, 4 which transmits the verification result reply signal. This enables the relay apparatus 2 to identify an incorrect rewriting operation with the rewriting target program by receiving the verification result reply signal that indicates that the verification result is a failure. In contrast, the relay apparatus 2 is enabled to identify a hardware fault occurring by not receiving the verification result reply signal. The relay apparatus 2 is thus enabled to identify individually an incorrect rewriting operation with the target program and a hardware fault occurring, which are distinguished from each other. Furthermore, upon identifying an incorrect rewriting operation with the rewriting target program, the relay apparatus 2 can identify the ECU 3, 4 in which an incorrect rewriting operation with the rewriting target program is executed.

Moreover, the relay apparatus 2 stores the unit information, which identifies the ECU 3, 4 in which a rewriting operation with the rewriting target program is ended, in the RAM 16 being non-volatile. This enables the relay apparatus 2 to transmit a verification result request signal to the ECU 3, 4 that is identified using the unit information by acquiring the unit information stored in the RAM 16 being non-volatile, even after being rebooted.

Further, when the relay apparatus 2 fails to receive a verification result reply signal from the ECU 3, 4 within a predetermined period of time since a point of time when transmitting a verification result request signal to the ECU 3, 4, the verification result request signal is transmitted again to the ECU 3, 4. This increases the opportunity to receive the verification result reply signal from the ECU 3, 4, enabling an incorrect rewriting operation with the target program and a hardware fault occurring to be identified individually while being distinguished from each other and increasing the accuracy.

Furthermore, when the relay apparatus 2 identifies an incorrect rewriting operation with the rewriting target program, an incorrectness identifying signal is transmitted to the different ECU 3, 4 that is other than the ECU 3, 4 in which the incorrect rewriting operation with the target program is executed. Upon receiving the incorrectness identifying signal from the relay apparatus 2, the different ECU 3, 4 identifies an incorrect rewriting operation with the rewriting target program in the ECU 3, 4, and a fail-safe operation is executed such as interrupting a process which the different ECU 3, 4 executes in cooperation with the ECU 3, 4. This can reduce influence from the incorrect rewriting operation with the rewriting target program and increase the safety.

Further, upon identifying the incorrect rewriting operation with the rewriting target program, the relay apparatus 2 transmits an incorrectness identifying signal to the display apparatus 5. Upon receiving the incorrectness identifying signal from the relay apparatus 2, the display apparatus 5 displays the displayed information which indicates that the incorrect rewriting operation with the rewriting target program is executed in the ECU 3, 4. This enables the driver etc. to be informed of the situation where an incorrect rewriting operation is executed.

Further, when the relay apparatus 2 identifies an incorrect rewriting operation with the rewriting target program, an incorrectness identifying signal is transmitted to the communication apparatus 6. Upon receiving the incorrectness identifying signal from the relay apparatus 2, the communication apparatus 6 transmits the transmission information, which indicates that the incorrect rewriting operation with the rewriting target program is executed in the ECU 3, 4, to the server 40 via a wide-area communication network. This enables the server 40 to receive the transmission information to thereby manage collectively the situation where an incorrect rewriting operation with the rewriting target program is executed. If the server 40 is managed by an automobile maker, an appropriate measure can be taken by the automobile maker such as searching the situation of incorrect rewriting.

Without being limited to examples in the above-mentioned embodiment, the present disclosure may be modified or extended as far as not deviating from the scope.

The present embodiment provides an example configuration where the first ECU 3 is rebooted and executes a preparatory process at boot while the relay apparatus 2 is rebooted and executes an incorrect rewriting operation detecting process. Alternatively, the first ECU 3 may execute a preparatory process at boot at a different point of time other than a point of time of being booted; the relay apparatus 2 may execute an incorrect rewriting operation detecting process at a different point of time other than a point of time of being booted. Even if the first ECU 3 or the relay apparatus 2 is not booted, the first ECU 3 may execute a preparatory process at boot after a predetermined period of time elapses since transmitting a rewriting end notice signal, while the relay apparatus 2 may execute an incorrect rewriting operation detecting process after a predetermined period of time elapses since receiving a rewriting end notice signal.

The configuration where an incorrectness identifying signal is transmitted to the different ECU 3, 4, the display apparatus 5, or the communication apparatus 6 may be omitted.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

The invention claimed is:

1. A data communication system for vehicles, comprising:
a relay apparatus; and
an electronic control unit,
the relay apparatus being configured to
receive a rewriting target program including a communication control program from a rewriting apparatus, and
transmit the received rewriting target program to the electronic control unit, while receiving a verification result from the electronic control unit,
the electronic control unit including
a first storage configured to store a communication control program,
a second storage configured to store a rewriting target program, and
a verifier configured to
decrypt a signature being encrypted, the signature being stored in the second storage when the rewriting target program is stored in the second storage, and
verify the decrypted signature with a signature calculated from the rewriting target program stored in the second storage,
wherein:
when a verification result by the verifier is a success, the electronic control unit is configured to activate the rewriting target program stored in the second storage, then transmitting a verification result reply signal that indicates that the verification result is a success to the relay apparatus; and
when a verification result by the verifier is a failure, the electronic control unit is configured to activate the communication control program stored in the first storage, then transmitting a verification result reply signal that indicates that the verification result is a failure to the relay apparatus,
wherein
in response to reception of the verification result reply signal that indicates that the verification result is a success from the electronic control apparatus after transmitting the verification result request signal to the electronic control unit, the relay apparatus is configured to identify a correct rewriting operation with the rewriting target program in an electronic control unit which transmits the verification result reply signal, whereas
in response to reception of the verification result reply signal that indicates that the verification result is a failure from the electronic control apparatus after transmitting the verification result request signal to the electronic control unit, the relay apparatus is configured to identify an incorrect rewriting operation with the rewriting target program in an electronic control unit which transmits the verification result reply signal.

2. The data communication system for vehicles according to claim 1, wherein
the relay apparatus includes a non-volatile storage,
wherein unit information is stored in the non-volatile storage, the unit information identifying the electronic control unit in which the rewriting operation with the rewriting target program is ended.

3. The data communication system for vehicles according to claim 1, wherein
upon failing to receive the verification result reply signal from the electronic control unit within a predetermined period of time since a point of time when transmitting the verification result request signal to the electronic control unit, the relay apparatus transmits again the verification result request signal to the electronic control unit.

4. The data communication system for vehicles according to claim 3, wherein
the relay apparatus is configured to identify a hardware fault that occurs in the electronic control unit in response to that a value of counting verification result request signals transmitted to the electronic control unit becomes greater than a preset value.

5. The data communication system for vehicles according to claim 1, wherein
upon identifying the incorrect rewriting operation with the rewriting target program, the relay apparatus transmits an incorrectness identifying signal to a different electronic control unit that is other than the electronic control unit in which the incorrect rewriting operation with the target program is executed.

6. The data communication system for vehicles according to claim 1, further comprising:
a display apparatus configured to display displayed information,
wherein:
upon identifying the incorrect rewriting operation with the rewriting target program, the relay apparatus transmits an incorrectness identifying signal to the display apparatus; and
upon receiving the incorrectness identifying signal from the relay apparatus, the display apparatus displays the displayed information which indicates that the incorrect rewriting operation with the rewriting target program is executed.

7. The data communication system for vehicles according to claim 1, further comprising:
a communication apparatus configured to transmit transmission information to a server,
wherein:
upon identifying the incorrect rewriting operation with the rewriting target program, the relay apparatus transmits an incorrectness identifying signal to the communication apparatus; and
upon receiving the incorrectness identifying signal from the relay apparatus, the communication apparatus transmits to the server the transmit information which indicates that the incorrect rewriting operation with the rewriting target program is executed.

* * * * *